United States Patent
Levine et al.

(10) Patent No.: US 10,101,753 B1
(45) Date of Patent: Oct. 16, 2018

(54) AUXILIARY SPRINKLER CONTROLLER FOR A SMART SPRINKLER SYSTEM AND METHOD OF OPERATING SAME

(71) Applicant: Michael R. Levine, Pinckney, MI (US)

(72) Inventors: Michael R. Levine, Pinckney, MI (US); Luke Dickens, Fortson, GA (US)

(73) Assignee: Michael R. Levine, Pinckney, MI (US)

( * ) Notice: Subject to any disclaimer, the term of this patent is extended or adjusted under 35 U.S.C. 154(b) by 0 days.

(21) Appl. No.: 15/297,298

(22) Filed: Oct. 19, 2016

Related U.S. Application Data

(63) Continuation-in-part of application No. 13/966,869, filed on Aug. 14, 2013, now Pat. No. 9,504,213.

(60) Provisional application No. 61/729,842, filed on Nov. 26, 2012.

(51) Int. Cl.
  *G05B 15/00* (2006.01)
  *G05D 7/06* (2006.01)
  *G05B 15/02* (2006.01)

(52) U.S. Cl.
  CPC ........... *G05D 7/0676* (2013.01); *G05B 15/02* (2013.01)

(58) Field of Classification Search
  CPC .............................. G05D 7/0676; G05B 15/02
  See application file for complete search history.

(56) References Cited

U.S. PATENT DOCUMENTS

| | | |
|---|---|---|
| 3,886,378 A | 5/1975 | Morgan |
| 5,761,312 A | 6/1998 | Zelikovitz et al. |
| 6,314,340 B1 | 11/2001 | Mecham et al. |
| 6,452,499 B1 * | 9/2002 | Runge ..................... G01W 1/00 137/78.2 |
| 6,850,819 B1 | 2/2005 | Townsend |
| 7,883,029 B2 | 2/2011 | Chalemin et al. |
| 7,949,433 B2 | 5/2011 | Hern et al. |
| 2003/0093159 A1 | 5/2003 | Sieminski |
| 2005/0273205 A1 | 12/2005 | Nickerson et al. |
| 2006/0100747 A1 | 5/2006 | Runge et al. |
| 2006/0202051 A1 | 9/2006 | Parsons et al. |
| 2007/0293990 A1 | 12/2007 | Alexanain |
| 2008/0027586 A1 | 1/2008 | Hern et al. |
| 2008/0147205 A1 | 6/2008 | Ollis et al. |
| 2008/0234870 A1 | 9/2008 | Chalemin et al. |
| 2009/0316671 A1 | 12/2009 | Rolf et al. |
| 2010/0301133 A1 | 12/2010 | Altieri et al. |
| 2011/0093123 A1 * | 4/2011 | Alexanian ............. A01G 25/16 700/284 |

(Continued)

FOREIGN PATENT DOCUMENTS

| | | |
|---|---|---|
| EP | 2201834 A1 | 6/2010 |
| EP | 2342965 A1 | 7/2011 |

(Continued)

*Primary Examiner* — Mark A Connolly
(74) *Attorney, Agent, or Firm* — The Concept Law Group; Scott M. Garrett

(57) ABSTRACT

An auxiliary sprinkler controller is used to control sprinkling by selectively enabling or inhibiting operation of a legacy sprinkler controller. The legacy sprinkler controller provides electrical power to a particular zone of several zones during each of a plurality of durations, and multiple durations, "n," are provided for each zone. As a result, each zone can be watered for any of $2^n$ combinations of the durations for a desired total watering duration.

23 Claims, 11 Drawing Sheets

(56) References Cited

U.S. PATENT DOCUMENTS

| | | |
|---|---|---|
| 2011/0224836 A1 | 9/2011 | Hern et al. |
| 2011/0237227 A1 | 9/2011 | Kemery et al. |
| 2011/0270448 A1* | 11/2011 | Kantor ................. A01G 25/165 700/284 |
| 2012/0035898 A1 | 2/2012 | Repelli et al. |
| 2012/0095604 A1* | 4/2012 | Alexanian ............... A01G 25/16 700/284 |
| 2012/0215366 A1 | 8/2012 | Redmond et al. |
| 2012/0229284 A1 | 9/2012 | Hern et al. |
| 2012/0239211 A1 | 9/2012 | Walker et al. |
| 2012/0303168 A1* | 11/2012 | Halahan ............... A01G 25/165 700/284 |
| 2014/0117108 A1* | 5/2014 | Hong ................... A01G 25/167 239/64 |

FOREIGN PATENT DOCUMENTS

| | | |
|---|---|---|
| EP | 2354878 A1 | 8/2011 |
| WO | 1999048354 A1 | 9/1999 |
| WO | 2005062961 A2 | 7/2005 |
| WO | 2007149949 A1 | 12/2007 |
| WO | 2009002757 A2 | 12/2008 |
| WO | 2011044289 A1 | 4/2011 |

\* cited by examiner

1000

| ZONE / SUBSETS | A | B | C |
|---|---|---|---|
| 1 20 Min | 7:00 – 7:20 | 7:20 – 7:40 | 7:40 – 8:00 |
| 2 10 Min | 8:00 – 8:10 | 8:10 – 8:20 | 8:20 – 8:30 |
| 3 5 Min | 8:30 – 8:35 | 8:35 – 8:40 | 8:40 – 8:45 | ated in the text.

AUXILIARY SPRINKLER CONTROLLER FOR A SMART SPRINKLER SYSTEM AND METHOD OF OPERATING SAME

REFERENCE TO RELATED APPLICATIONS

This application claims priority to U.S. Provisional Patent Application Ser. No. 61/729,842, filed Nov. 26, 2012, and U.S. Non-Provisional Applicant Ser. No. 13/966,869, filed Aug. 14, 2013, the entire contents of which are hereby incorporated by reference.

FIELD OF THE DISCLOSURE

This invention relates generally to the irrigation of land and, in particular, to an auxiliary sprinkler controller for use in an existing sprinkler system that is configured to water in multiple zones for multiple durations each day in each zone, where the auxiliary sprinkler controller enables or inhibits each specific duration to achieve a desired combination of durations for each specific zone's watering needs.

BACKGROUND

Modern irrigation systems, such as lawn sprinklers, often include multiple watering zones. The user typically sets an irrigation control timer to set the frequency and duration of watering for those zones. At the pre-programmed time, the system cycles through the various watering zones, sprinkling each zone for the set duration corresponding to that zone. More modern sprinkling controllers allow a user to set an initial condition of the controller where each zone can be watered for several durations during the day. So, for example, given five zones, the controller can have a first subset of durations of 20 minutes of sprinkling per zone, then another subset of durations of 15 minutes of sprinkling per zone, where the first subset of durations is followed by the second subset of durations, which is followed by a third subset, and so on.

Simple irrigation systems often waste water because the programmed watering time occurs immediately before, during or after a natural rainstorm event. More expensive systems address this problem by employing a rain sensor. After a set amount of rain has fallen, the sensor engages a switch that will prevent the timer from watering (e.g., http://www.rainbird.com/iandscape/products/controflerS/RSD.htm). U.S. Pat. No. 7,949,433 describes the use of a rain threshold to enable or disable power to an irrigation system. An interface unit is connected in series with the common line of the sprinkler activation lines. When the interface unit determines or receives an indication that a rain threshold has been exceeded and/or that other criteria have been met, the interface unit inhibits the switching device, breaking the common line. This effectively disables all electrical signals via the activation lines to the valves, until the switch is closed. In this way, the irrigation control timer 30 is not aware that the watering has been interrupted or overridden.

One significant drawback of rain sensors is that, since they have no weather prediction or forecast capability, they ignore rainfall that occurs soon (i.e., within 24-hours) after the programmed watering time. If this happens, over-watering occurs and water is wasted. The cost of water in numerous urban areas has led to more sophisticated and purportedly effective irrigation solutions, some of which take weather predictions and forecasting into account.

Another drawback of rain sensors is that they are restricted to watering only on a fixed pattern of days (usually on specific days of the week, if not every day) set by the sprinkler timer. This is inherently sub-optimal, since watering may be forced to occur shortly after a recent rain event, in order to ensure that enough watering occurs before the next allowable watering day.

U.S. Pat. No. 7,883,029 discloses an irrigation system including a radio transmitter station that transmits weather prediction information to a geographic region that includes multiple geographic sub-regions. The weather prediction information includes a respective geographic sub-region code for each of the geographic sub-regions for which a weather forecast predicts rain within a predetermined time period. An irrigation apparatus in a particular sub-region activates to water a watering zone at a schedule time. However, if the irrigation apparatus receives the sub-region code for the particular sub-region where the irrigation apparatus is located, the irrigation apparatus does not immediately activate to water the watering zone in one embodiment. The transmitter station may transmit both program content and data content on a common radio frequency signal wherein the data content includes the weather prediction information.

The use of weather information via the Internet for sprinkler control has been suggested before, as in the OpenSprinkler project: http://rayshobby.net/?page id=160 & http://rayshobby.net/blog/?p1500. Other systems take advantage of radar data. U.S. Pat. No. 6,850,819, for example, resides in an irrigation control system that comprises a meter to measure one or more weather conditions, a monitor to examine rainfall data derived from radar scanning and to extract data which is representative of the scanned rainfall; and a controller to calculate a moisture content value, a predetermined moisture content value, and regulate irrigation in accordance with the computed values.

These solutions amount to a "water, or don't water" type of operation, where if, at the time irrigation is to occur, there is rain occurring, then irrigation is prevented. However these systems fail to acknowledge that irrigation is often not needed every day, and that in many settings irrigation is only needed once every few days to ensure sufficient watering. Even in systems set up to water every few days instead of daily looking at whether it is raining or not on the day of, or at the time irrigation is to occur, leads to excess watering since rain can occur between irrigation days. Following a conventional irrigation schedule, irrigation can occur after a rain day, on a day when it is not raining. These systems fail to shift the schedule of irrigation since they only allow scheduling of irrigation to occur on specific days or at specified intervals.

Furthermore, conventional sprinkler and irrigation systems require changes in programming or operation to be made manually, at the sprinkler controller, and require being reprogrammed when special irrigation is no longer needed. For example, if new sod is put down, heavier than normal irrigation is required for one to two weeks in order to ensure the sod takes root and becomes established. After that period, the programming or control settings of the controller must be manually reverted to a normal irrigation schedule to prevent excess watering. However, in many large operations such as parks, for example, personnel can lose track of which controllers need to be changed or reprogrammed. In many cases sod may be put down in only one zone, so the extra watering is only needed in that one zone. Likewise, there can be a situation where a zone is receiving too much water. Currently, sprinkling controllers do not allow differing watering durations between zones in way that is easy to program and then revert without manually changing the setting at the controller.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
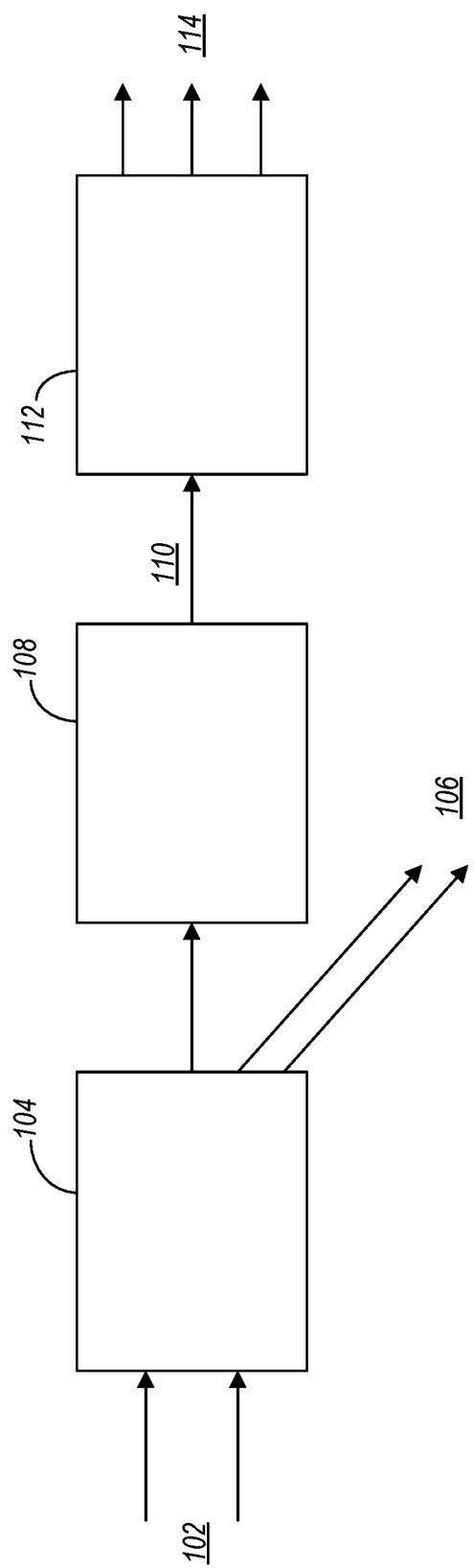
FIG. 1 is a block diagram that illustrates an overview of the system, in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

The disclosure discusses various embodiments of an auxiliary sprinkler controller that, in general, is configured to take advantage of the operation of a legacy sprinkler controller. By selectively inhibiting or enabling each of the durations (i.e. sprinkling durations) of the legacy sprinkler controller, each zone can receive a customized total sprinkling duration, allowing some zones to have more irrigation and others to have less, or none. Furthermore, in some embodiments, the auxiliary sprinkler controller can communicate with remote devices and receive instructions with regard to which durations of the legacy sprinkler controller to inhibit and which to enable. In some embodiments the auxiliary sprinkler controller can learn an initial condition of the legacy sprinkler controller, meaning the start time and length of each duration. Accordingly, some embodiments include a method for operating a sprinkler system having a legacy sprinkler controller configured to provide a plurality of n durations daily to each of a plurality of sprinkler zones, each duration having a time of occurrence and length. The method includes, at the time of occurrence for each of the plurality of durations, an auxiliary sprinkler controller selectively inhibiting or enabling sprinkling for each duration according to a watering program of the auxiliary sprinkler controller, thereby allowing $2^n$ different values of total sprinkling duration for each of the plurality of zones.

Some embodiments can include a Smart Sprinkler System (SSS) that uses rainfall information, from radar and other weather data obtained from the Internet, to send a control signal to a sprinkler system power controller that will either interrupt or enable power to the sprinkler system, and it allows a person to remotely program the sprinkler system for a desired schedule, including varying the amount of watering in different zones of the sprinkler system. No local weather sensors or intelligence are required at the sprinkler system site and the device may be used in conjunction with existing sprinkler timers. From the Internet, historical radar and other weather information, in addition to forecast precipitation information is used to make a decision to selectively enable or disable the solenoid(s) of the sprinkler system. An algorithm which compares the rainfall amount of the last several days and predicted rainfall for the next day(s), to a required rainfall threshold, will determine the decision to water. There is one sprinkler system power controller per sprinkler timer. The algorithm decision (enable power=water, or disable power=do not water) is transmitted to each sprinkler power controller as a schedule, which then enables/disables watering according to the schedule by controlling sprinkler system power.

System Overview

FIG. 1 is a block diagram that illustrates an overview of the system. In broad and general terms, the system includes at least one service center 104 receiving weather information 102. The service center 104 can send out sprinkler ON/OFF (i.e., activation/deactivation) signals 106 to a plurality of sprinkler controllers 108. Alternatively, the service center 104 can send out schedule data to a smart controller unit at the sprinkler controller site that can implement the schedule of watering/not watering. The sprinkler controllers, in turn, enable/disable power according to the ON/OFF signals 110 to the sprinkler solenoids (or both solenoids and timer) 112 operative to activate sprinkler zones 114. Each of these subsystems will now be described in further detail, as there are multiple alternative embodiments in each case.

Service Center

The intelligence of the SSS resides at the Service Center 104. It is anticipated that there will be at least one service center 104 associated with a given geographical area, and that each geographical area will include numerous commercial or residential sprinkler timers controlled by each center. While a given Service Center 104 may include human personnel, in the preferred embodiment, all control signals or schedules are sent out entirely on an automated basis.

At each Service Center 104, local radar rainfall data, forecast information, and other weather data are collected from the Internet on a daily basis. The radar images are converted to rainfall rates using known conversion methods. As discussed elsewhere herein, the predicted rates may be corrected by available rain gauge data and/or other weather information. Historical and predicted rainfall information are used to decide whether or not to allow watering at each location that is timer-controlled by the system, and the decisions are delivered via signals or schedules 106, shown in FIG. 1.

A primary source of precipitation information for a user's site will be from radar images for the user's sprinkler's location, obtained over the Internet. There are now different types of radar images available, and the invention is not limited in terms of acquisition technology. Some images use Base Reflectivity, which is a display of echo intensity (reflectivity) measured in dBZ (decibels of Z, where Z represents the energy reflected back to the radar). Base Reflectivity images are available at several different elevation angles (tilts) of the antenna and are used to detect precipitation, evaluate storm structure, locate atmospheric boundaries and determine hail potential. Other image types use Composite Reflectivity, which displays maximum echo intensity (reflectivity) from any elevation angle at every range from the radar; One-Hour Precipitation, which is an image of estimated one-hour precipitation accumulation on a 1.1 nm by 1 degree grid, is used to assess rainfall intensities for flash flood warnings, urban flood statements and special weather statements; Storm Total Precipitation is an estimate of accumulated rainfall, continuously updated, since the last one-hour break in precipitation. This product is used to locate flood potential over urban or rural areas, estimate total basin runoff and provide rainfall accumulations for the duration of the event; and services similar to StormTrac (cbs12.com/weather/features/animating-radar) which provides near-term prediction of where a rain cell will be in the next several hours.

Figure 2:
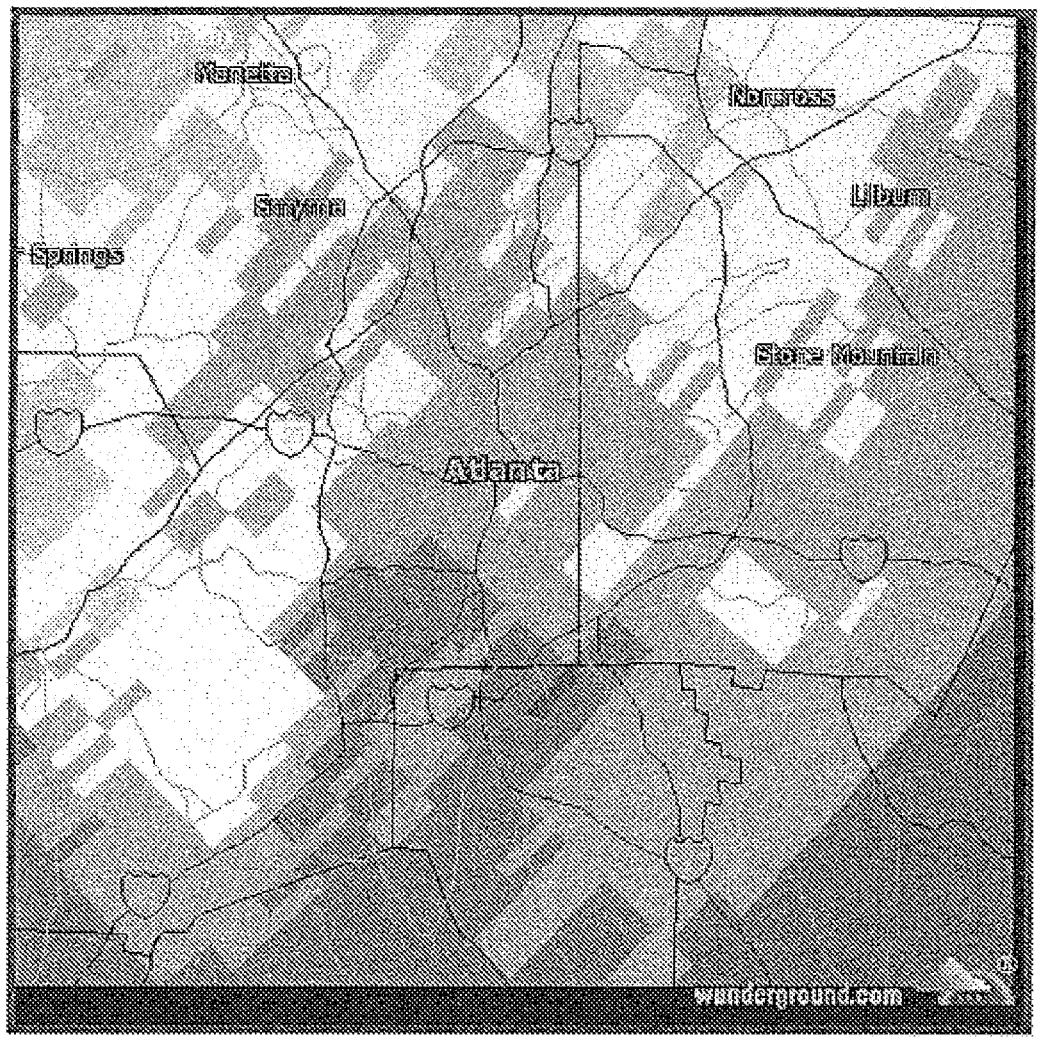
FIG. 2 is a sample radar image from the Weather Underground website, in accordance with some embodiments.
Figure 3:
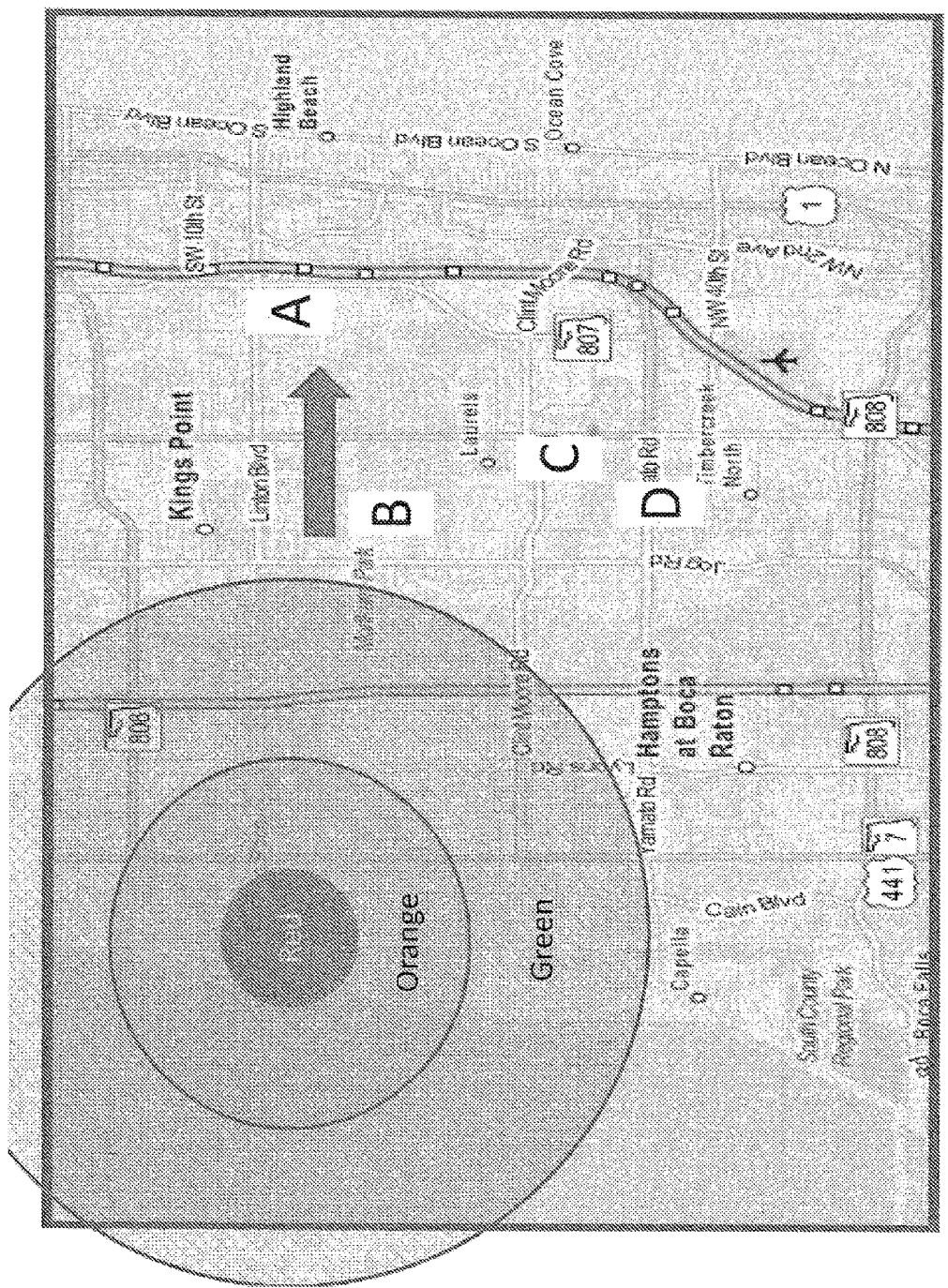
FIG. 3 illustrates how each radar frame represents reflectivity from the sky above a particular geographic location, in accordance with some embodiments.

Again, the invention is not limited in terms of the radar technology, and may use any available imagery or radar weather data, including yet-to-be developed, higher-resolution modalities. Using Base Reflectivity as an example, the input to the system is the analyzed radar image (dBZ intensity), with the output being average color which is indicative of estimated rainfall. The colors of the pixel(s) in the images represent radar reflectivity values measured in dBZ. These values are then converted into rainfall rates (see: desktopdoppler.com/help/nws-nextrad.htm). FIG. 2 is a sample radar image from the Weather Underground website (www.wunderground.com). On a periodic basis, for example every 5 minutes, a frame of data is downloaded from the website, and each frame represents the radar reflectivity from the sky above a particular geographic location, as shown in FIG. 3.

Figure 4:
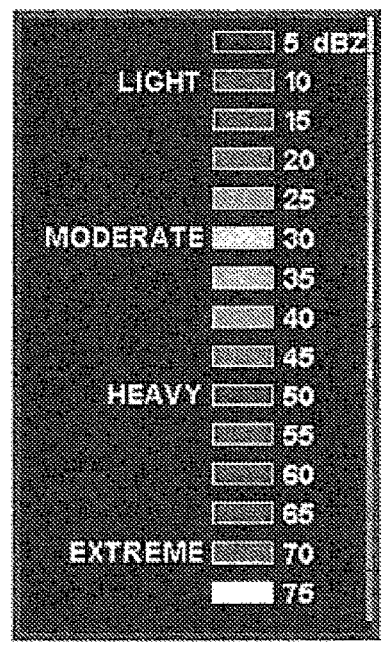
FIG. 4 illustrates how each radar frame represents reflectivity from the sky above a particular geographic location.

FIG. 4 is the NOAA's table of conversion from dbZ to rainfall. Each color translates dBZ to a numerical value, and each numerical value is added to the daily summary. In accordance with the invention, each day, the system generates an estimated rainfall for a plurality of geographical regions.

Zip Code Information

The user's Zip Code (Zip+4) can be used to identify the user's location and default soil/grass type.

Decision Algorithm

The algorithm, in part, makes decisions based on recent watering events, or whether or not a quantum of rain has recently fallen or is predicted to occur within 24-hrs. A quantum of rain is defined as the output of a typical sprinkler head during a watering event and is proportional to the duration of a watering event, and is a desired amount of water for the conditions and type of soil/grass being watered without over-watering. This value will be adjustable by the user according to individual watering desires. A combination of both historical and forecast precipitation (and other weather information) can be used to decide whether to water on a given day.

The sprinkler timer will be set to water every day of the week. This means that the system is not limited to a fixed pattern of watering and is able to water on any day, i.e. has a variable pattern. Because of the this capability, incorrect rain predictions have little real effect on watering efficiency, since watering will occur the following day, due to the lack of historical rain. In fact, it can be shown that this ability to water on any day is inherently superior to any system that has a fixed pattern of watering. To demonstrate this, consider a lawn that requires watering only once every seven days. Here is an illustration of watering frequency, comparing a system using a fixed pattern of watering vs. a system using a variable pattern of watering that can be shifted due to rainfall:

The following examples have the following parameters in common:
  The area to be watered requires at least a quantum of water at least once every seven days.
  The fixed pattern system is only permitted to water every seventh day.
  The variable pattern system may water on any day, and waters at least once every seven days.

Example 1

| Day: | 1 | 2 | 3 | 4 | 5 | 6 | 7 |
|---|---|---|---|---|---|---|---|
| Fixed: | Watering | | | | | | |
| Variable: | Watering | | | | | | |

-continued

| Day: | 8 | 9 | 10 | 11 | 12 | 13 | 14 |
|---|---|---|---|---|---|---|---|
| Fixed: | Watering | | | | | | |
| Variable: | Watering | | | | | | |

| Day: | 15 | 16 | 17 | 18 | 19 | 20 | 21 |
|---|---|---|---|---|---|---|---|
| Fixed: | Watering | | | | | | |
| Variable: | Watering | | | | | | |

Example 1 compares what would happen in both systems under drought conditions with no rain. The watering events are identical. This example illustrates that the variable pattern employed by the invention performs no worse than the fixed pattern under drought conditions.

Example 2

| Day: | 1 | 2 | 3 | 4 | 5 | 6 | 7 |
|---|---|---|---|---|---|---|---|
| Fixed: | Watering | | | | | | |
| Variable: | Watering | | | | | | |

| Day: | 8 | 9 | 10 | 11 | 12 | 13 | 14 |
|---|---|---|---|---|---|---|---|
| Fixed: | Watering | | | | | | |
| Variable: | Watering | | | | | | |

| Day: | 15 | 16 | 17 | 18 | 19 | 20 | 21 |
|---|---|---|---|---|---|---|---|
| Fixed: | Watering | | | | | | |
| Variable: | | | | Watering | | | |

In Example 2, it rained at least a quantum of water on the eleventh day. The fixed pattern system must water on the $15^{th}$ day, since the next opportunity to water would be on the $22^{nd}$ day, and that would result in an unacceptable period without water (i.e., 14 days). Since the variable pattern system can water on any day, it delays or shifts watering until the $18^{th}$ day, already an improvement over the fixed pattern system.

Example 3

| Day: | 1 | 2 | 3 | 4 | 5 | 6 | 7 |
|---|---|---|---|---|---|---|---|
| Fixed: | Watering | | | | | | |
| Variable: | Watering | | | | | | |

| Day: | 8 | 9 | 10 | 11 | 12 | 13 | 14 F |
|---|---|---|---|---|---|---|---|
| Fixed: | Watering | | | | | | |
| Variable: | | | | | | | |

| Day: | 15 | 16 | 17 | 18 | 19 | 20 | 21 |
|---|---|---|---|---|---|---|---|
| Fixed: | Watering | | | | | | |
| Variable: | | | | | | | |

In Example 3, on the $14^{th}$ day, rain was forecast for the $15^{th}$ day (indicated by the letter 'F'). The forecast was correct and it rained on the $15^{th}$ day. It is observed that the variable pattern system is able to skip watering on the $15^{th}$ day. This results in a delaying watering until the $22^{nd}$ day (not shown). The fixed pattern system must water on the 15th day.

Example 4

| Day: | 1 | 2 | 3 | 4 | 5 | 6 | 7 |
|---|---|---|---|---|---|---|---|
| Fixed: | Watering | | | | | | |
| Variable: | Watering | | | | | | |

| Day: | 8 | 9 | 10 | 11 F | 12 | 13 | 14 F |
|---|---|---|---|---|---|---|---|
| Fixed: | Watering | | | | | | |
| Variable: | | Watering | | | | | |

| Day: | 15 | 16 | 17 | 18 | 19 | 20 | 21 |
|---|---|---|---|---|---|---|---|
| Fixed: | Watering | | | | | | |
| Variable: | | Watering | | | | | |

In Example 4, on the $14^{th}$ day, rain was forecast for the $15^{th}$ day (indicated by the letter 'F'). The forecast was incorrect and it did not rain on the $15^{th}$ This is the worst-case scenario for the variable pattern system. It can be observed that the variable pattern algorithm skips watering on the $15^{th}$. However, watering occurs the following day due to the lack of previous rain, and prevents any practical adverse effect on the irrigated area. This is a "self-healing" property of the variable pattern. The fixed pattern system has no such self-healing capability, since it cannot water until the next scheduled watering day. The possibility of a missed forecast appears to show potential worse performance for the variable pattern system. In reality, however, the overall effect would be de minimus, due to the self-healing property. The water savings resulting from the variable pattern system's capability to maximize delay in watering due to rain (shown in Example 2), a relatively frequent event, will dwarf any minimal savings lost due to the rare occurrence of an erroneous forecast.

The fact that all days are available for watering allows the algorithm to continually delay watering due to rain (or predicted rain) events, and can shift the required watering to the maximum number of days in the future. Thus if watering is scheduled to occur on the $15^{th}$ day of the month, and rain occurs on the $12^{th}$ day, the watering schedule will be shifted from the $15^{th}$ to the $19^{th}$ since the $19^{th}$ is seven days after the $12^{th}$ when natural watering occurred. If no more rain falls, then the next watering after the $19^{th}$ will occur on the $26^{th}$ and every seven days thereafter until another rain even occurs or is forecast to occur. The Fixed Pattern system cannot do this, since it cannot shift its schedule to perform watering on the optimal day. Therefore, in practice, the variable-shifting pattern system is superior to a fixed pattern system, and the fact that the system can water on any day makes the variable pattern system possible. The SSS requires that all pins be pulled on the wheel that sets the day-frequency of watering on the pre-existing electromechanical sprinkler timer (or the equivalent procedure performed on an electronic timer) to allow for the capability of watering on any day.

A simple example of the decision algorithm is:
IF an area forecast shows a high probability of at least a quantum of rain in the next 24 hours:
   Do not Water
OR ELSE IF a StormTrac radar indicates that a rain cell will cause a quantum of rain to fall on the user's location in the next 2 hrs:
   Do not Water
OR ELSE IF watering or rainfall has occurred in the past n days:
   Do not Water and Shift Watering Schedule
OR ELSE:
   Water In the algorithm above, the percentage value used for 'high probability' and the default quantum value may be adjusted as more empirical evidence is gathered. The value of n is the number of days that a quantum of rain has not fallen and has a default value of 2, however, it is also adjustable according to the user's desires. When rainfall has occurred, the watering schedule is shifted so that the next scheduled sprinkling will occur n days after the rainfall. The algorithm may also adjust the number of days to shift the watering schedule, proportional to the actual number of quanta of actual rainfall. Other relevant weather information (e.g., temperature, wind) and user information (e.g. soil type, grass type) could be incorporated into the decision algorithm.

Transmission of Control Signals to the Controller

In general, the algorithm decision uses rainfall data information, rain forecast and previous client recorded decisions as inputs to make the next-day decision for each client. Watering decisions are calculated per location, depending on location watering requirement, watering and rainfall history, and rainfall prediction/forecast. These decisions are recorded at the Service Center.

The Service Center then transmits the decision to each Sprinkler System Power Controller at the appropriate time, or configures a respective schedule for each Sprinkler System to be followed by each Sprinkler System. When this scheduled event (e.g., an email or a scheduled Google Calendar event) occurs it, in turn, triggers the Sprinkler Controller. This may be accomplished using a web service, such as IFTTT. In the some embodiments, exactly one ON or OFF signal is sent from the Service Center to each client site, every 24 hours, and zone timing is performed by the pre-existing sprinkler timer settings. In some embodiments a schedule can be forwarded to a Sprinkler System that is configured to receive, store, and implement a schedule whenever the schedule changes due to user input or rainfall.

Sprinkler System Power Controller(108)

In response to signals received form the Service Center 104, the Sprinkler System Power Controller 108 will inhibit or allow power to the solenoids (or both solenoids and timer) of a sprinkler system equipped with a pre-existing electronic or electromechanical sprinkler timer 112. The Sprinkler System Power Controller connects to the sprinkler system through the rain sensor inputs to the timer, if available. Otherwise, the Sprinkler System Power Controller will be connected to the sprinkler system through standard home circuitry wiring and will control power to the sprinkler system by interrupting the common wire. See http://water-heatertimer.org/How-to-wire-Intermatic-sprinkler-timers.html for examples of electromechanical sprinkler timers with and without rain sensor terminals.

Figure 5:
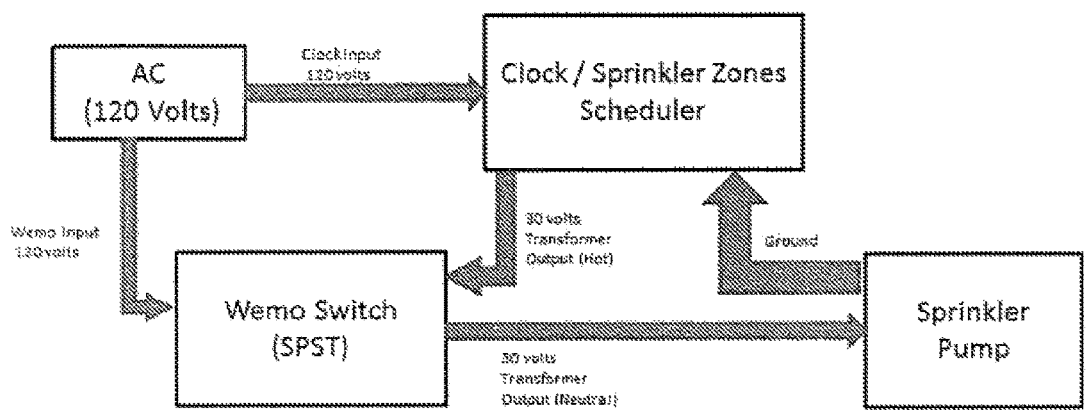
FIG. 5 is a block diagram showing the way in which a WeMo switch may be used to interrupt a sprinkler pump.
Figure 6:
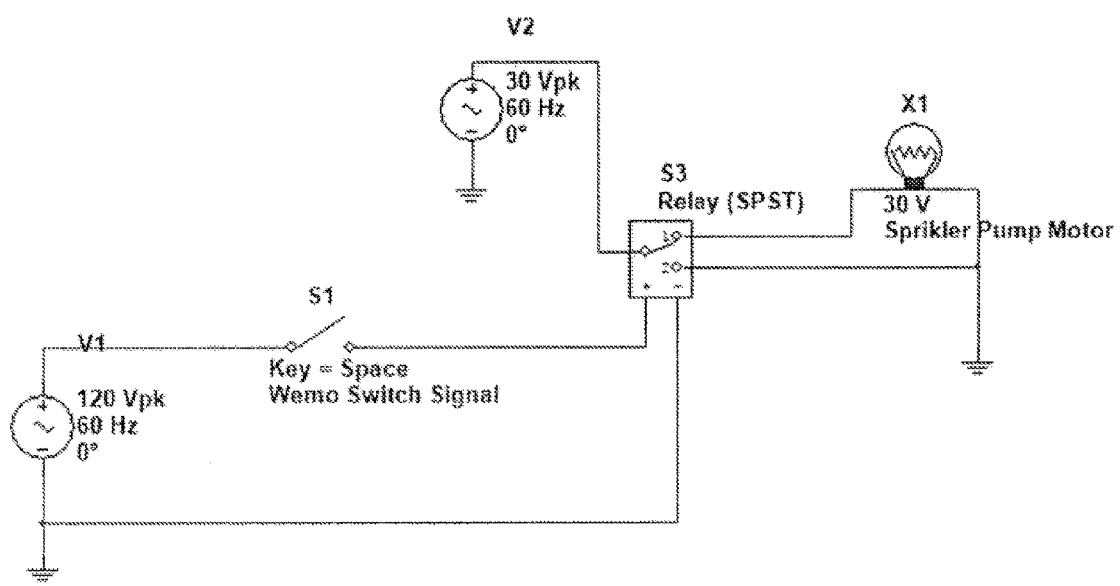
FIG. 6 is an electrical diagram of the block diagram of FIG. 5 showing the BelkinWeMo operating as a simple switch that opens or closes a relay.
Figure 7:
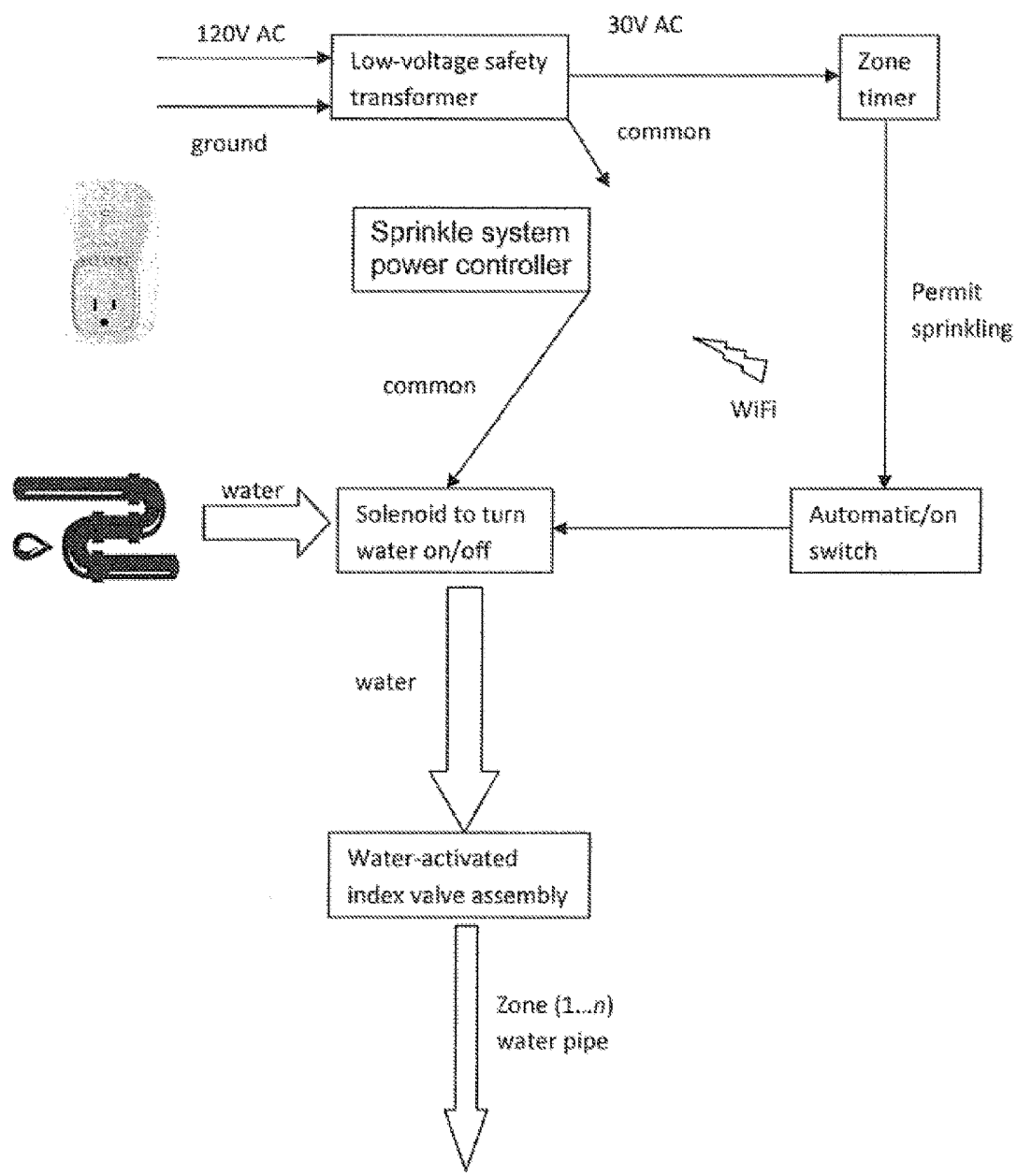
FIG. 7 illustrates the use of a WeMo switch that can interrupt the common wire.

An example of an off-the-shelf device that may be used as a Sprinkler System Power Controller is the BelkinWeMo (http://www.belkin.com/us/wemo-switch). It is designed to interrupt 110V power to a target device. It may be physically modified so that it can be directly tied into the rain sensor inputs of the sprinkler timer. FIG. 5 is a block diagram showing the way in which a WeMo switch may be used to interrupt a sprinkler pump. FIG. 6 is an electrical diagram of the block diagram of FIG. 5 showing the BelkinWeMo operating as a simple switch that opens or closes a relay. FIG. 7 illustrates the use of a WeMo switch that can interrupt the common wire.

Caller ID

To interrupt the sprinkler in accordance with a different aspect of the invention, CallerID may be used. In such embodiments, a message is sent from a particular phone number, and when the message is received at the Sprinkler Controller, recognition of that phone number enables the sprinkler system. The "content" of the message is immaterial. When the message is received again, recognition of that phone number disables the sprinkler system. If no signals are received in 24 hr. period, the system reverts to the predetermined watering schedule when there is no rain, in which case the sprinkler system delivers the desired amount of water following a predetermined number of days, n, without watering. In the preferred implementation of this embodiment, the recognition of a valid CallerID is received (i.e., turn the system ON/OFF), the system automatically takes the phone off-hook momentarily then hangs up. This accomplishes two things. First, this prevents multiple, longer-term ringing of the phone, and secondly, pick-up and hang-up serves as a confirmation to the caller that the message was indeed received.

Modes of Operation

The sprinkler controller precisely controls watering by allowing or interrupting power to the sprinkler at desired times, based on historical and forecast rainfall and other weather information acquired by the Service Center. The interruption can be responsive to signals received at the Sprinkler Controller for ON/OFF operation, or in response to the Sprinkler Controller implementing a previously received watering schedule. Existing mechanical sprinkler systems (e.g., Intermatic: http://www.youtube.com/watch?v=xTONP3Z1Bf8) can operate in one of two modes of operation, ON and AUTO, as dictated by a switch setting on the sprinkler system hardware. Such modes can be simulated using electronic timers (e.g., RainBird: http://www.youtube.com/watch?v=kHisHSYWTu4). This invention can make use of either mode of operation for any style of controller, though the AUTO mode is preferred.

In the AUTO mode, the sprinkler system power controller inhibits watering by the sprinkler for any 24-hour period by interrupting power to the sprinkler system based the signals received from the Service Center. When the system has power, the daily sprinkler timing is controlled by the pre-existing sprinkler timer. The pre-existing sprinkler timer, whether it is electromechanical or programmable, will be set to water every day, and when power is supplied to the sprinkler system in this mode, watering will occur according to the schedule determined by the pins in an electromechanical sprinkler timer or by the schedule programmed into an electronic timer.

In an alternate embodiment, the sprinkler timer is set to the ON mode and causes the sprinkler system to water whenever there is power supplied to the sprinkler system. The sprinkler system power controller precisely controls watering by allowing or interrupting power to the sprinkler in accordance with the signals received from the Service Center. In another mode, a programmable timer can be programmed with multiple watering schedules, where each schedule has a selected watering time duration that can be selected. One or more of these schedules, in normal operation, can be run by the programmable timer to water accordingly (i.e. without the Sprinkler Controller disabling operation). This type of programmable timer, to work with the Sprinkler Controller, is programmed to run all programmed schedules every day, and the Sprinkler Controller selectively enables or disables the sprinkler solenoid(s) to effect the schedule it received from the Service Center, thereby imposing a desired watering schedule over the daily watering schedules programmed into the programmable timer. The pre-existing sprinkler timer never controls sprinkler timing; sprinkler individual zone watering is at all times controlled by timed signals or a schedule from the Service Center, and carried out by the Sprinkler Controller.

Example 1

This example pertains to an electronic programmable timer or an electromechanical timer set to AUTO (i.e., watering occurs according to the zone durations set by the pins). In this embodiment, the sprinkler timer schedule is set to water every day of the week and is identical for all days of the week.

The algorithm will either inhibit or permit watering based on historical and/or forecast weather information, and a signal is received from the Internet to open or close the switch in the Sprinkler System Power Controller. The switch closes when watering is desired. The switch opens to inhibit watering.

In order to maintain rotational synchronicity, power to the pre-existing timer is maintained even when power to the sprinklers is interrupted. In the case where a rain sensor is available or where the common wire is interrupted, inhibition of sprinkling for periods of 24-hrs is preferred since the pre-existing timer can be used for zone timing and only a single pair of ON/OFF signals would be needed when watering for any particular day.

Example 2

This example pertains to an electromechanical timer set to AUTO, where power to the home circuitry is interrupted. Operation is same as in EXAMPLE 1, except that power interruption must be for 24-hr. periods and zone timing is controlled by the pre-existing sprinkler timer. Power is interrupted to both the sprinkler solenoids and the electromechanical timer. Therefore, power interruption must be for 24-hr. periods so that the timer maintains rotational synchronicity with the 24-hr. cycle.

Example 3

This example pertains to an electromechanical timer set to ON (i.e., the sprinkler continues to water as long as power is supplied; when power is restored after it has been interrupted, the sprinkler indexes to the next zone and continues watering). In this embodiment, the timer settings of the existing sprinkler timer are not used. Instead, all timing is controlled by appropriate power ON/OFF signals sent to the Sprinkler System Power Controller.

In this mode of operation, the Service Center sends timed signals to water in accordance with the desired length of watering time for each zone. The system is initially sent a signal to interrupt power so that watering does not begin until the watering cycle is to start. At the beginning of the watering cycle, power is restored to the system to begin watering the first zone. A power interruption signal is sent at the end of the watering duration for that zone. After a brief interval of time to allow for zone termination, power is restored to the system, causing the system to index to the next zone and resume watering. This process continues until all zones have been completed and the final zone receives its termination signal and interrupts power. As a fail-safe measure, a daughter board that incorporates a timing circuit may be integrated in this embodiment to prevent the system from excess watering due to a communications failure.

Figure 8:
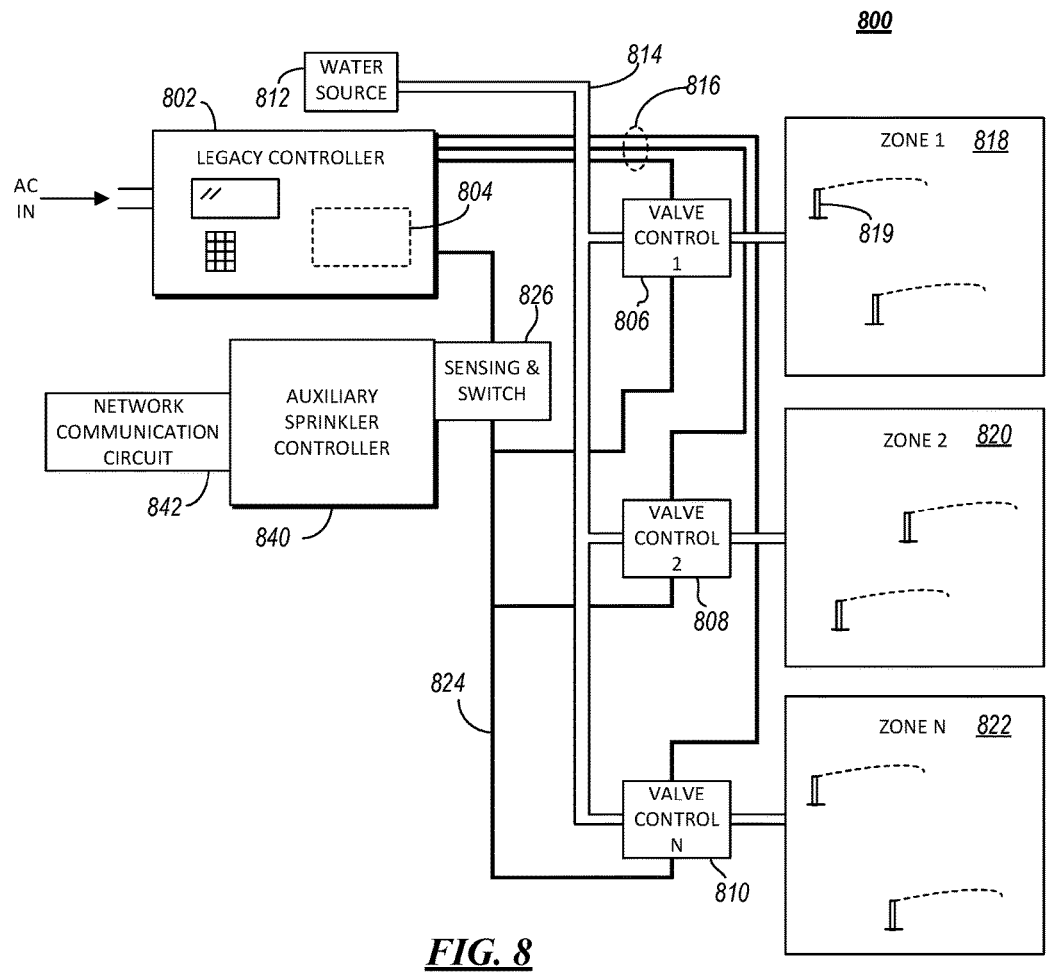
FIG. 8 is a block diagram of a sprinkler system including a legacy sprinkler controller in accordance with some embodiments.

FIG. 8 is a block diagram of a sprinkler system 800 including a legacy sprinkler controller 802 in accordance with some embodiments. In the system 800 the legacy sprinkler controller 802 is used by an auxiliary sprinkler controller 840 to carry out a watering program in which select ones of sprinkling durations of the legacy sprinkler controller 802 and enabled or inhibited to achieve a desired total sprinkling time for each of several zones (e.g. zones 818, 820, 822). Furthermore, the auxiliary sprinkler controller can, by selectively enabling on inhibiting operation of the legacy sprinkler controller, achieve the processes given in examples 1-3. The watering program effectively carried out by the auxiliary sprinkler controller allows for variations in total duration of sprinkling per zone, allowing temporary adjustments in sprinkling to water more or less for, which can automatically revert back to a normal watering program, and which can be programmed remotely, thereby obviating the need for manual programming or setting adjustments at the site of the legacy sprinkler controller 802.

The legacy sprinkler controller 802 can be an electronically programmable controller that provides a plurality of durations for sprinkling each zone 818, 820 822. The durations each have a daily start time and length. During each duration the legacy sprinkler controller 802 provides electricity to a particular valve controller for the zone being sprinkled. The legacy sprinkler controller 802 is configured to provide n durations per zone, where n is at least 2. Accordingly there are at least n durations per zone, allowing for a total of $2^n$ possible total watering time combinations for each zone, including no watering. The durations can be set or programmed into the legacy sprinkler controller as an initial condition 804, which specifies the start time (directly or indirectly) and length for each duration as well as the zone to which the duration applies. Normally, because of water pressure, the durations do not overlap in time. Without the auxiliary sprinkler controller 840, each duration would cause sprinkling to occur in the corresponding zone, at the designated start time, and for the specified length of time. Sprinkling in each zone 818, 820, 822 is controlled by a corresponding valve. Thus zone 1 818 is controlled by valve control 1 806, zone 2 820 is controlled by valve control 2 808, and zone N 822 is controlled by valve control 810. Each valve control 806, 808, 810 includes a solenoid controlled valve. When a valve is opened, water flows from a water source 812 through a pipe system 814 connected to each valve control 806, 808, 810, and through the open valve, which is connected to sprinkling heads such as sprinkling head 819.

To cause the valve for each zone 818, 820, 822 to operate, the legacy sprinkler controller 802 applies electrical voltage and current (derived from a commercial AC electric power source, "AC in") to each respective valve controller 806, 808, 810 at the time of a preset duration for the corresponding zone. The legacy sprinkler controller 802 provides a separate electrical line 816 for each valve control 806, 808, 810, which are all connected to a common return line 824 which is, without the auxiliary sprinkler controller 840 present, coupled to the legacy sprinkler controller 802. However, the auxiliary sprinkler controller 840 interrupts the return line 824 between the legacy sprinkler controller 802 and all of the valve controls 806, 808, 810 with a sensing and switch circuit 826. The sensing and switch circuit include a switch such as a relay that is operable to open the connection of return line 824 between the legacy sprinkler controller 802 and the valve controls 806, 808, 810 to prevent electric current from flowing when the switch is open, and to allow the flow of electric current when the switch is closed. The switch is controlled by the auxiliary sprinkler controller 840. When the auxiliary sprinkler controller 840 opens the switch, no current can flow, and therefore none of the valve controllers 806, 808, 810 will operate even when the legacy sprinkler controller applies electricity to the valve controllers 806, 808, 810. Therefore the auxiliary sprinkler controller 840 can inhibit or allow sprinkling by opening or closing the switch of the sensing and switch circuit 826. The auxiliary sprinkler controller operates according to a watering program, which it can receive via a network communication circuit 842, which can be a wireless or wired communication circuit, and which allows the auxiliary sprinkler controller to send and receive information, including a watering program. The watering program indicates which of the n durations of the legacy sprinkler controller 802 are to be enabled or inhibited to allow or prevent sprinkling on a given day for that particular duration. Sprinkling can be enabled or inhibited during, any, all, or none of the durations of the legacy sprinkler controller for $2^n$ combinations or total watering duration for each zone. The durations are set as an initial condition of the legacy sprinkler controller.

Figures 10, 11:
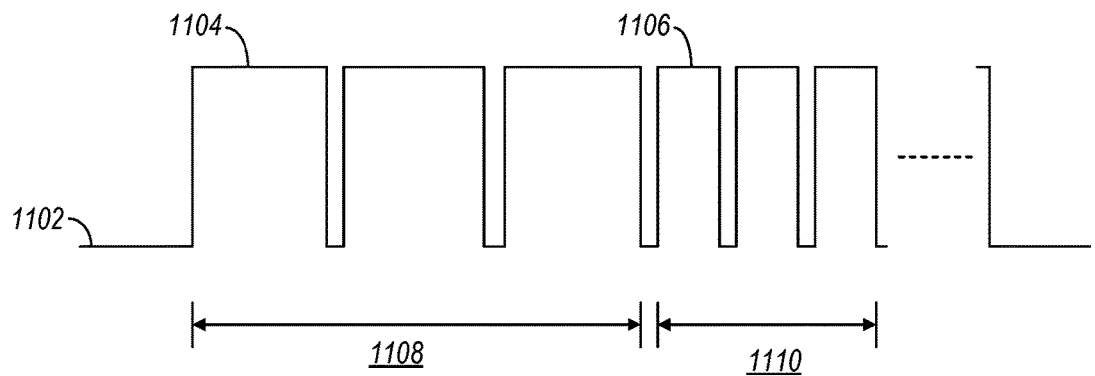
FIG. 10 is a diagram indicating the duration times and lengths of a multi-zone legacy sprinkler controller to be selectively enabled or inhibited by an auxiliary sprinkler controller, in accordance with some embodiments.
FIG. 11 is a duration diagram in which the durations are represented as pulses during which a legacy sprinkler controller output electricity to a sprinkler zone, in accordance with some embodiments.

Such an initial condition of a legacy sprinkler controller 802 is represented in FIG. 10. In FIG. 10, there are three zones indicated, zones A, B, and C. There are also three subsets of durations shown, subsets one, two, and three. Subset 1 is, as an example, set to start at 7:00 and includes durations A1, B1, and C1 that will, if each are enabled, water each zone for 20 minutes. Subset 2 occurs after subset 1, and is set to commence at 8:00 and includes durations A2, B2, and C2 that will, if each are enabled, water each zone for 10 minutes. Subset 3 is set to occur after subset 2, commencing at 8:30, and includes durations A3, B3, and C3 which, if each are enabled, result in watering zones A, B, and C for 5 minutes each. Thus there are nine durations in total, and eight combinations of durations possible for each zone. For example, zone A can be enabled for watering during none of durations A1, A2, or A3 (meaning no watering at all occurs), or watering during any or all of durations A1, A2, and A3. The list of combinations is: none, A1, A2, A3, (A1+A2), (A1+A3), (A2+A3), or (A1+A2+A3). Given that there are three zones of eight combinations, there are a total of 512 (8×8×8) total combinations of durations that can be achieved on a given day, using the present example. Those skilled in the art will appreciate that the durations represented by those in FIG. 10 are exemplary, and that a sprinkler system can have more or fewer zones, or more or fewer subsets of durations.

Accordingly, for example, the auxiliary sprinkler controller can be first configured to enable sprinkling during durations A1, B1, and C1 every 3 days. Initially, then, the auxiliary sprinkler controller will enable sprinkling by closing the switch in the sense and switch circuit 826 during durations A1, B1, and C1 on the first day, and inhibit sprinkling during durations A2-C2, and A3-C3 by opening the switch, and then on the following two day, inhibiting all sprinkling, and repeating this three day pattern. At some time thereafter, for example, sod may be laid down in zone C, so the sprinkling will need to be adjusted for zone C as follows: on the first day sprinkling is enabled during durations A1, B1, and C1, C2, and C3, and on the next two days sprinkling is enabled only during durations C1, C2, and C3, and this pattern is repeated until the sod is established, where the watering program can revert to the original program. Likewise, the watering program can be shifted or adjusted in view of rainfall events in accordance with examples 1-3.

In order to provide the watering program to the auxiliary sprinkler controller 840, a network communication circuit 842 can be used to facilitate communication between the auxiliary sprinkler controller 840 and a remote device. The network communication circuit can be, for example, a wired network interface (e.g. Ethernet), a local wireless interface (e.g. WiFi, Bluetooth), or a cellular transceiver interface to connect to a cellular network infrastructure. The remote device can be a smartphone, a tablet computing device, or a server, among other examples. The watering program is information that indicates the durations of the legacy sprinkler controller during which sprinkling is to be enabled, and the durations during which sprinkling is to be inhibited, for a given day. In some embodiments, the watering program can be for several days, even though the auxiliary sprinkler controller 840 may receive the watering program every day.

In order to device the watering program, the remote device can provide an interface to a user that allows the user to select which durations of the legacy sprinkler controller are to be enabled and which are to be disabled. The user can select durations for each zone to account for the desired amount of watering for each day. Once the user has finished, the watering program can be communicated to the auxiliary sprinkler controller 840.

In some embodiments the user may know the duration start times and lengths, but in some embodiments the auxiliary sprinkler controller can detect the durations while in a learning mode. In the learning mode the auxiliary sprinkler controller leaves the switch in the sense and switch circuit 826 closed to allow current to flow, and commences monitoring to detect electric current pulses passing through the return line 824. Every pulse detected represents a duration for sprinkling a particular zone. The pulses indicate the start times and lengths of all of the durations for sprinkling that are programmed or set in the legacy sprinkler controller 802, and the start times and lengths can be recorded by the auxiliary sprinkler controller 840 to indicate an initial condition of the legacy sprinkler controller. The time of occurrence and length of each pulse can be measured using a clock of the auxiliary sprinkler controller. Furthermore, the switch and sense circuit 826 can be used to check operation of the legacy sprinkler controller 802, and well as to detect anomalous operation of the legacy sprinkler controller. When the switch is open, such as when the auxiliary sprinkler controller is inhibiting sprinkling, voltage will be evident across the open switch assuming the legacy sprinkler controller 802 is applying electricity at the expected time. Outside of the expected times of the sprinkling durations of the legacy sprinkler controller 802, the auxiliary sprinkler controller can leave the switch closed, or open, based on user selection. In some embodiments the auxiliary sprinkler controller 840 can be locally overridden to allow for maintenance activities and checking operation of the sprinkler system, including pipes and sprinkler heads.

Figure 17:
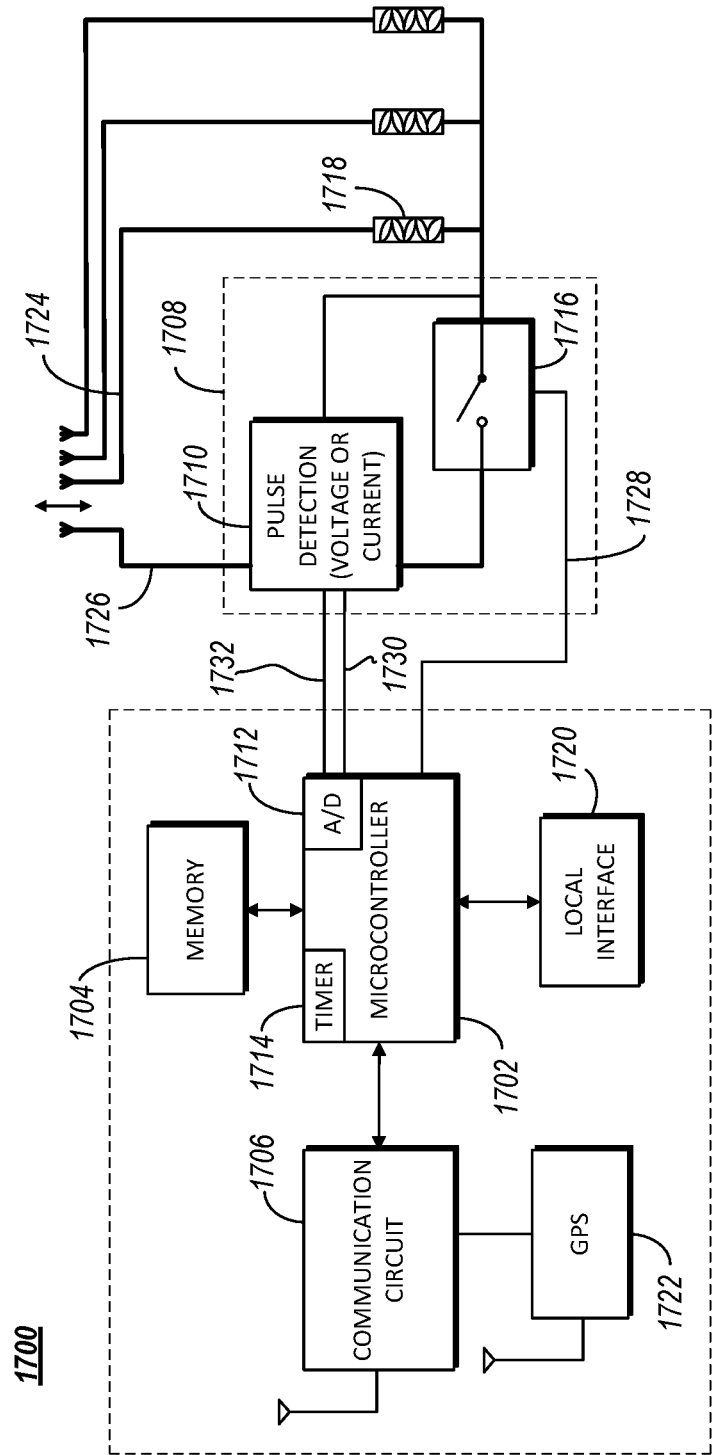
FIG. 17 is a block schematic diagram of an auxiliary sprinkler controller, in accordance with some embodiments.

FIG. 17 shows a block schematic diagram of an auxiliary sprinkler controller 1700, in accordance with some embodiments. The auxiliary sprinkler controller 1700 can be an example of auxiliary sprinkler controller 840 of FIG. 8, and includes a microcontroller 1702 that operates by execution of programmatic instructions that can be stored in a portion of a memory 1704, to which the microcontroller 1702 is operably coupled (e.g. by a data bus). The memory 1704 can represent an aggregation of different types of memory used by the auxiliary sprinkler controller 1700, and can include non-volatile memory such as read only memory (ROM), flash memory (e.g. firmware), as well as random access memory (RAM). The memory 1704 is also used to store a watering program that indicates when to enable and when to inhibit operation of the legacy sprinkler controller. The microcontroller can further operate a calendar or other day-timing system 1714, as is well known. The microcontroller 1702 can be interfaced with a network communication circuit, such as, for example, a cellular transceiver 1706. A cellular transceiver 1706 operates as a subscriber unit of a cellular telephony system and is able to access data communication channels to the Internet. The cellular transceiver 1706 can be used to establish communication with a remotely located server using an established data communication protocol. The microcontroller 1702 can therefore send and receive information to and from a remotely located server (or other networked device), including sending the detected initial condition of the legacy sprinkler controller (e.g. 802) to the server, and receiving the watering program, as well as adjustments and updates. A local interface 1720 can be included in order to allow a local connection to the auxiliary sprinkler controller 1700 for maintenance and diagnostics.

The cellular transceiver 1706 can include, or be coupled to, a Global Positioning Satellite (GPS) receiver 1722. The GPS receiver can detect the location of the auxiliary sprinkler controller, and the location can be reported to the server, which can be used to determine whether rain has fallen at the location of the auxiliary sprinkler controller 1700. Furthermore, GPS signals include a very accurate time reference that can be used by the microprocessor to ensure that the timer 1714 is accurate.

A sensing and switch circuit 1708 is used to sense current and voltage provided by the legacy sprinkler controller to one or more sprinkler valves 1718 for a respective sprinkling zone. The sensing and switch circuit 1708 can be substantially similar to the sensing and switch circuit 826 and includes a controllable switch 1716 that is controlled by the microprocessor 1702 via control line 1728. The switch 1716 can be, for example, a relay, and is operable to open or close the return line 1726 between the legacy sprinkler controller and the valves 1718. The legacy sprinkler controller provides electricity to open a valve 1718 between lines 1724 and 1726, for example. The application of electricity can be detected by a pulse detection circuit 1710 that can detect electrical current when switch 1716 is closed, and voltage when switch 1716 is open. A current sense signal on line 1730 and a voltage sense signal on line 1732 are provided to the microprocessor for evaluation. The sense signals can be proportional to the level of current and voltage detected, or they can be comparator outputs the change state when the current or voltage reach a preselected threshold level. The switch 1716 can be closed in order to first detect the durations provided by the legacy sprinkler controller, including the start time and length of each duration. Thereafter the switch 1716 can be selectively opened or closed contemporaneously with the occurrence of each duration on subsequent days in order to accomplish the desired watering as indicated to the watering program of the auxiliary sprinkler controller.

Figure 9:
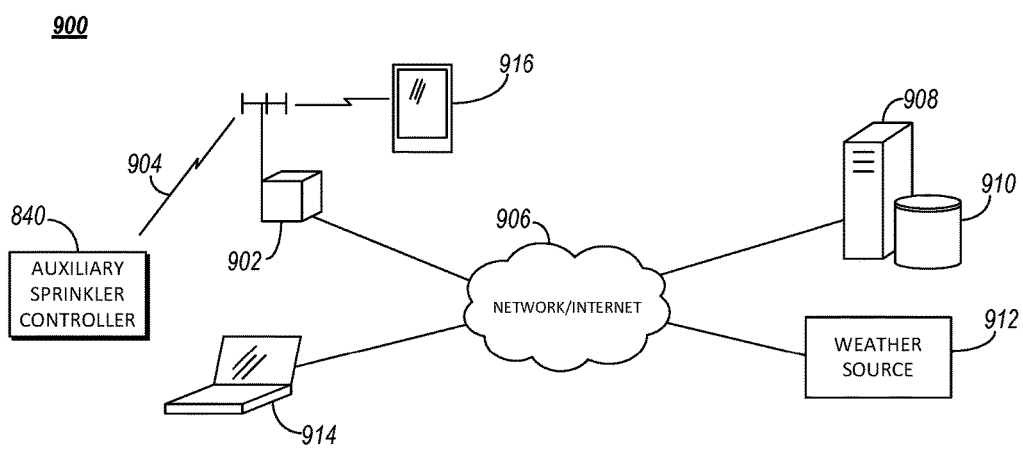
FIG. 9 is a system diagram of an auxiliary sprinkler controller system, in accordance with some embodiments.

FIG. 9 is a system diagram of an auxiliary sprinkler controller system 900, in accordance with some embodiments. In the system 900 an auxiliary sprinkler controller 840 communicates with a base station 902 of a cellular telephony system using an air interface 904 that facilitates communication over the Internet 906. Using the data communication network (the cellular telephony system and Internet), the auxiliary sprinkler controller 840 can communicate with a server 908. The server 908 is coupled to a data store 910 in which an account can be maintained for the auxiliary sprinkler controller 840. Information can be associated with the account such as a current watering program to be used by the auxiliary sprinkler controller 840, a record of the durations of a legacy sprinkler controller associated with the auxiliary sprinkler controller 840, the location of the auxiliary sprinkler controller 840, and access credentials to restrict access to authorized persons. The server 908 uses the account information to provide an interface such as a web page to a remotely located computing device, such as computer 914 or mobile device 916, to allow a user of devices 914, 916 to set or adjust a watering program, as well as to see what watering has occurred, including rain events that caused a shift in the watering program followed by the auxiliary sprinkler controller 840. The server 908 can access a weather source 912 that indicates rainfall across geographic regions to determine whether rain has fallen at the location of the auxiliary sprinkler controller, and how much rain has fallen at the location of the auxiliary sprinkler controller 840. The weather source 912 can be a radar source, such as that illustrated in FIGS. 2-3, and can indicate an amount of rainfall. When rain falls at the location of the auxiliary sprinkler controller 840, the day of occurrence of the rain (when the rain is a sufficient amount) can be used to shift an existing watering program of the auxiliary sprinkler controller to prevent over-watering.

FIG. 11 is a duration diagram 100 in which the durations are represented as pulses during which a legacy sprinkler controller output electricity to a sprinkler zone, in accordance with some embodiments. The duration diagram can be an example of electricity 1102 sensed by a sensing and switch circuit of an auxiliary sprinkler controller (e.g. 826). Pulses such as pulses 1104, 1106 can be detected and their duration, and the time between them, can be measured. In the present example three long pulses such as pulse 1104 occur in series, followed by three shorter pulses 1106. It may be given that there are three zones, or the existence of three zones may be inferred based on the repeating pattern of three pulses of equal duration. The longer pulses 1104 can represent, for example, durations of twenty minutes each which occur over time period 1108 while the shorter pulses 1106 can represent durations of ten minutes per zone over time period 1110. By detecting and measuring the pulses, the auxiliary sprinkler controller, or the server to which the pulse information is transmitted, can determine and chart or map the available durations for each zone, as shown, for example, in FIG. 10. Once this is accomplished, using the example of FIG. 10, it will then be determined that each zone can be watered for zero to thirty five minutes in five minute steps, which are eight ($2^n$ where n=3) different possible combinations of total watering duration.

Figure 12:
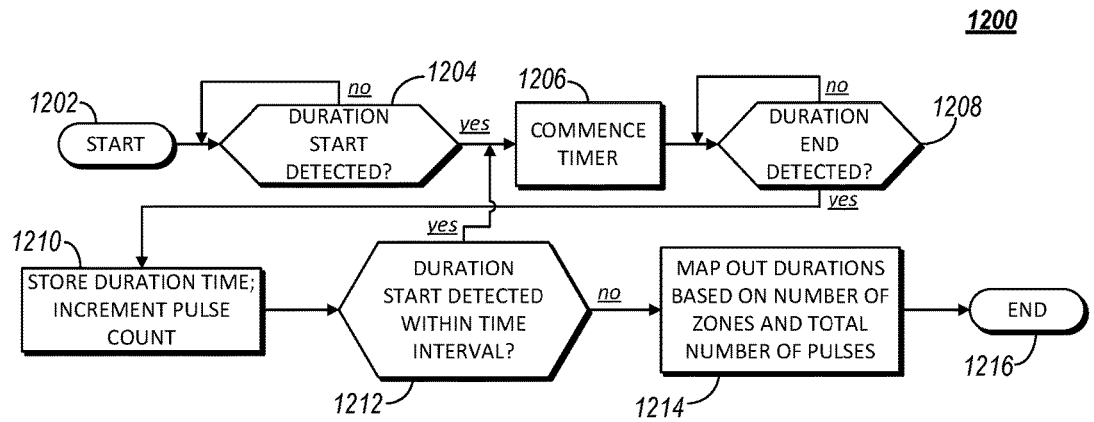
FIG. 12 is a flowchart diagram of a method 1200 for an auxiliary sprinkler controller and sprinkler controller system to learn the initial condition or setting of a multi-zone legacy sprinkler controller during a learning phase, in accordance with some embodiments.

FIG. 12 is a flowchart diagram of a method 1200 for an auxiliary sprinkler controller and sprinkler controller system to learn the initial condition or setting of a multi-zone legacy sprinkler controller during a learning phase, in accordance with some embodiments. The initial condition indicates the time and length of durations in which the legacy sprinkler controller provides electricity to the valve controls of the various zones of the sprinkling system. At the start 1202, the auxiliary sprinkler controller is installed and the legacy sprinkler controller is programmed or set with the initial condition or settings. At step 1204 the auxiliary sprinkler controller determines, via a sensing circuit such as switching and sense circuit 826, whether a positive edge (e.g. going from low to high voltage) is detected, indicating the start of a duration. In practice, the electricity provided by the legacy sprinkler controller is alternating current (AC), so the pulse (e.g. pulses 1104, 1106) represent the presence of electricity as AC, not a direct current (DC) pulse. However, the sensing circuity used to detect the occurrence of AC can provide a substantially DC sensing signal having positive and negative edges, indicating the start and end of a duration of AC provided by the legacy sprinkler controller. When the positive edge is detected, the auxiliary sprinkler controller then commences a timer to measure the duration for the first zone. In step 1208 the auxiliary sprinkler controller looks for a negative pulse edge (transitioning from high to low voltage), and upon detecting the negative edge, in step 1210 it stores the pulse length, and can increment a pulse count used to count the total number of pulses. In step 1212 the auxiliary sprinkler controller again looks for a positive pulse edge to occur within a preselected time interval (controlled, for example, by a time out timer). If another positive pulse is detected within the preselected time interval, the method 1200 returns to step 1206 and repeats another iteration of the method. If no positive pulse is detected in step 1212 before the end of the preselected time interval, then it is assumed to mean that the legacy sprinkler controller has completed all durations and has stopped for the day, and in step 1214, based on the pulse time of occurrence, length, and pulse count, the complete pattern of durations can be determined and mapped and the method 1200 ends 1216.

Figure 13:
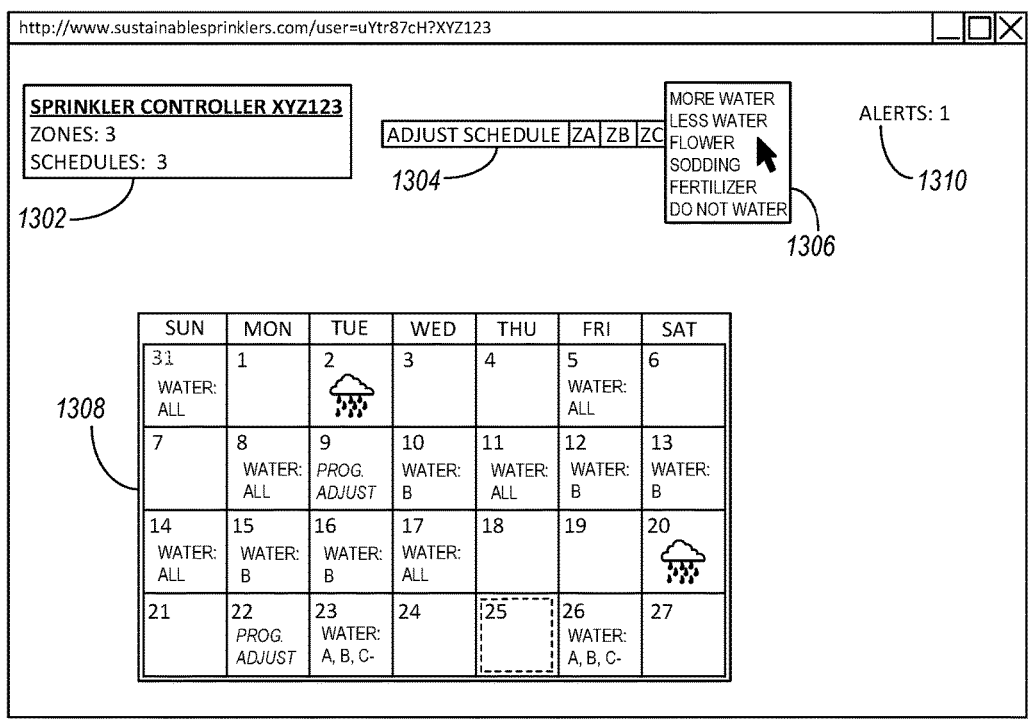
FIG. 13 shows an example of a browser interface for interacting with a server of a sprinkler control system to control an auxiliary sprinkler controller, in accordance with some embodiments.

FIG. 13 shows an example of a browser interface 1300 for interacting with a server of a sprinkler control system to control an auxiliary sprinkler controller, in accordance with some embodiments. The interface can be generated by, for example, server 908 in response to a request from computer 914, and transmitted to computer 914, which renders the information substantially as shown, and which shows information relating to auxiliary sprinkler controller 840. A first block 1302 can present information about the sprinkler system in which the auxiliary sprinkler controller is located, include an identifier of the auxiliary sprinkler controller ("XYZ123"), the number of zones, and the number and length of durations (e.g. 20 minutes per zone, 10 minutes per zone, etc.) of the legacy sprinkler controller that are available.

Block 1304 allows the user to select a zone and adjust or change total watering duration for that zone. In the example shown, the user has selected zone C ("ZC") resulting in pop-up menu 1306 being presented that offers several alternatives, including "more water," "less water," "flower," "sodding," "fertilizer," and "do not water." Selecting any of these options will adjust the total watering duration for that zone, either temporarily or until changed again by the user. As an example, a calendar 1308 can be presented which shows scheduled watering dates and events that happened, and that will happen. In the calendar 1308, assume the present day is the $25^{th}$, as indicated by the dashed border in the block for the $25^{th}$. Assume the watering program used by the auxiliary sprinkler controller is set to water the zones once every three days, unless there is a rain event, in which case the watering day is shifted (e.g. as in examples 1-3). Accordingly, even though the legacy sprinkler controller is set to provide durations every day, the auxiliary sprinkler controller interrupts the return line to prevent sprinkling from occurring except on every third day where the durations are selectively enabled to provide the desired total watering duration per zone, as indicated by the watering program. Thus, on the 30 of the prior month, sprinkling occurred, as indicated by "WATER: ALL" meaning all zones were watered. On the $31^{st}$, therefore, the auxiliary sprinkler controller closed the interrupt switch selectively during particular durations. Assume for this example, that the legacy sprinkler controller has three subsets of durations for 20, 10, and 5 minutes, respectively, as shown in FIG. 10, and that the user has enabled the 10 and 5 minute durations for all zones; as a result the "WATER: ALL" means all zones received 15 minutes of watering, but the interrupt switch remained open while the legacy sprinkler controller was providing the 20 minute duration subset, preventing watering from 7:00 to 8:00.

Since sprinkling is set to occur once every three days, then the next day of watering should have occurred on the $3^{rd}$ day of the month, but, as indicated by an icon, a rain event happened on the $2^{nd}$ day. Thus, the watering program was shifted and the next sprinkling day occurred three days after the rain event on the $5^{th}$ day of the month, and then again on the $8^{th}$ day of the month. On the $9^{th}$ day of the month, the watering program is adjusted by a user (i.e. using a pop-up menu similar to 1306) to indicate that zone B was sodded. Thus, zone B needs to be watered every day for at least a week. Accordingly, beginning on the $10^{th}$ day of the month, zone B is watered by the auxiliary sprinkler controller during every duration for zone B, even though the next regular watering day isn't until the $11^{th}$ day of the month. Therefore zone B continues to be watered every day until the $18^{th}$, and the other zones are watered every third day. From the $10^{th}$ to the $17^{th}$ zone B can further receive maximum watering time (e.g 35 minutes) by enabling watering for zone B during each of the 20, 10, and 5 minute durations for zone B (e.g. 7:20-7:40, 8:10-8:20, and 8:35-8:40). That means the auxiliary sprinkler controller closes the interrupt switch for those durations, and the electricity provided by the legacy sprinkler controller to the valve control of zone B causes watering to occur during those time times. Furthermore, during the "WATER: ALL" days of the $11^{th}$, $14^{th}$, and $17^{th}$ the watering for zone B can remain at 35 minutes total, while the watering for the other zones remains at 15 minutes. After the $17^{th}$, watering for zone B can revert to 15 minutes of total time, and to occur every third day.

On the $20^{th}$ day, which is the next watering day to water after the $17^{th}$, a rain event occurs, causing the watering program to again shift by three days to the $23^{rd}$. However, on the $22^{nd}$ day the watering program is again adjusted because, for example, zone C is getting too wet, so watering is reduced (e.g. selecting "less water" as indicated in 1306). Hence, on the $23^{rd}$, zone C receives less than normal water as indicated by "C-," indicating zone C received less water than the other zones. The watering is then set to next occur on the $26^{th}$. Accordingly, using the interface 1300, a user can see what has occurred, when the watering program was shifted due to rain, and when the watering program was adjusted. The interface 1300 can also include alerts 1310 that indicate the occurrence of a deviation from the expected watering program. For example, if service personnel manually operate the sprinkler system for maintenance (e.g. installing and checking new sprinkler heads), the detection of a pulse or pulses outside of the ordinary watering time will occur, and the auxiliary sprinkler controller can send an alert message to the server indicating such. Another alert can be generated when the pulses from the legacy sprinkler controller for the regular schedule have shifted in time, as can occur due to a power outage when the legacy sprinkler controller's back up battery is dead.

Figure 14:
FIG. 14 shows a pulse diagram of a watering program and maintenance pulses detected by the auxiliary sprinkler controller that cause the auxiliary sprinkler controller to generate an alert, in accordance with some embodiments.

FIG. 14 shows a pulse diagram 1400 of a watering program 1404 and maintenance pulses 1406 detected by the auxiliary sprinkler controller that cause the auxiliary sprinkler controller to generate an alert, in accordance with some embodiments. The pulses are produced by current being applied to one or more of the zones, and is represented by a sense signal 1402. Note that sense signals are provided for both voltage (when the switch is open) and current (when the switch is closed). Thus, pulses 1404 occur during expected time, and pulses 1406 occur outside of the expected time, and as a result the auxiliary sprinkler controller will generate an alert message indicating the anomaly, and transmit it to the server. Upon a user logging on to the web page for the sprinkler system, the alert will be presented (e.g. alert 1310), or alternatively the server can send an alert message to a designated user (e.g. email, text message).

Figure 15:
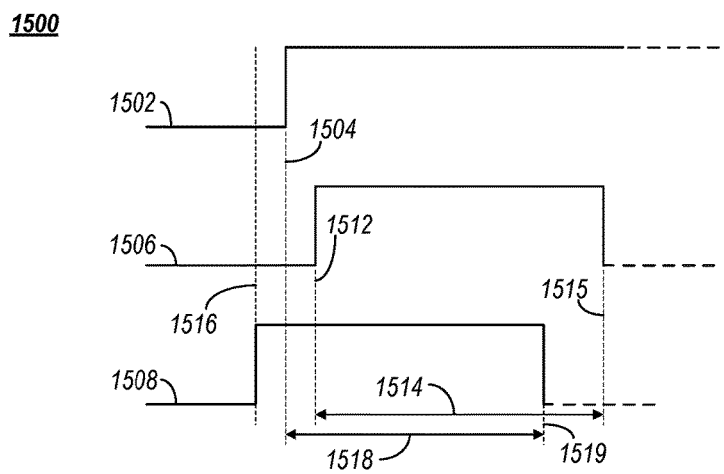
FIG. 15 is a pulse diagram showing examples of electricity durations, represented as pulses detected by an auxiliary sprinkler controller that indicate a time drift in the occurrence of the durations, in accordance with some embodiments.

FIG. 15 is a pulse diagram 1500 showing examples of electricity durations, represented as pulses detected by an auxiliary sprinkler controller that indicate a time drift in the occurrence of the durations, in accordance with some embodiments. In general, these are examples of anomalous operation of the legacy sprinkler controller that can be detected and used to generate an alert. In these charts time is graphed along the horizontal axis, and increases from left to right. Line 1502 represents the expected time of the start of the durations of the legacy sprinkler controller. If watering is to be enabled for the first zone during the first duration of the legacy sprinkler controller, the interrupt switch can be closed at time 1504, which should be shortly prior to the commencement of the duration. Line 1506 illustrates a drifted schedule of the legacy sprinkler controller having a late start, with the first positive edge of a pulse occurring at time 1512 and having a duration 1514, where at time 1515 the pulse ends. Line 1508 represents a drifted schedule where an expected duration of legacy sprinkler controller commences early, prior to time 1504 at time 1516. Both of these shift can indicate a loss of power at the legacy sprinkler controller, and that the backup battery of the legacy sprinkler controller is not working. As a result, a loss of power causes the time of occurrence of the durations to shift. In fact the durations can occur at a time many hours outside of the expected period of time in which the durations are to occur (e.g. several hours different). Since the legacy sprinkler controller will end the pulse at time 1519, a shortened watering duration 1518 can occur for the first enabled zone since the auxiliary sprinkler controller may open the switch in the return line. The shortened duration 1518 will be detected by the auxiliary sprinkler controller, which will generate an alert so that either the legacy sprinkler controller timing can be adjusted, or the watering program used by the auxiliary sprinkler controller can be adjusted to an earlier start time.

Figure 16:
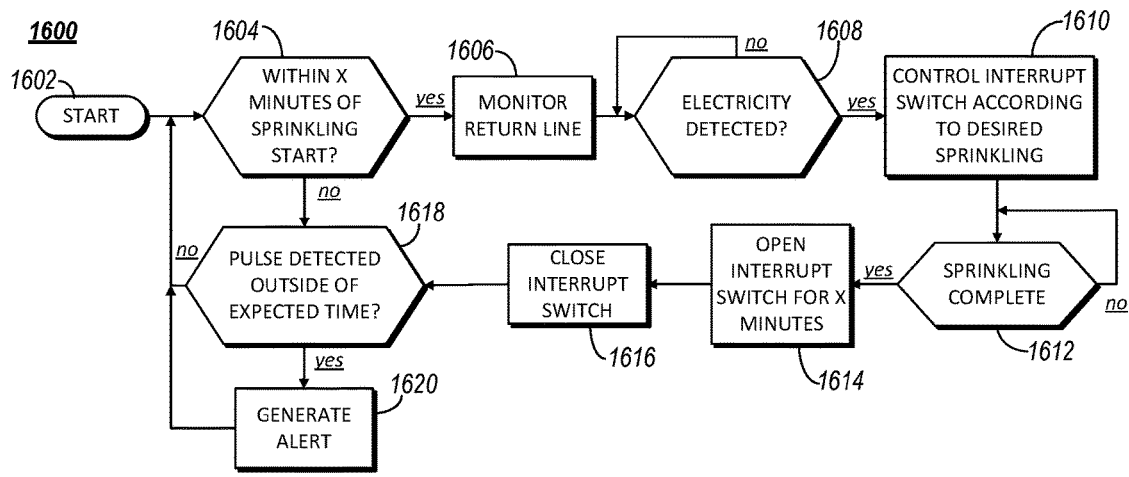
FIG. 16 is a flow chart of a method for detecting changes at a legacy sprinkler controller as detected by an auxiliary sprinkler controller, in accordance with some embodiments.

FIG. 16 is a flow chart of a method 1600 for detecting changes at a legacy sprinkler controller as detected by an auxiliary sprinkler controller, in accordance with some embodiments. At the start 1602, the auxiliary sprinkler controller and the legacy sprinkler controller are both powered on. The auxiliary sprinkler controller has received a watering program from the server indicating which durations (e.g. time and length) of the legacy sprinkler controller to enable and which to inhibit to achieve the desired watering duration for each zone. In some embodiments the watering program can result in watering occurring only every few days (i.e. every two to seven days), unless there is a rain event that delivers a sufficient quantum of water to the region, in which case the watering program can be shifted by n days, where n is the number of days, plus one, between sprinkling days. Thus, if sprinkling is to occur every three days then n would be 3. At step 1604 the auxiliary sprinkler controller determines a start of a duration of the legacy sprinkler controller that is to be enabled within some short time period (i.e. x minutes). When a duration of the legacy sprinkler controller that is to be enabled is about to commence the auxiliary sprinkler controller can close the switch and the method proceeds to step 1606 where the auxiliary sprinkler controller begins monitoring the current through the return line. At step 1608 the auxiliary sprinkler controller determines whether a current has been applied by the legacy sprinkler controller. Once the first pulse is detected in step 1608, then in step 1610 the auxiliary sprinkler controller operates the switch according to the watering program, closing the switch for certain durations of the legacy sprinkler controller and opening the switch for others, as the watering program may indicate. On some days that can mean that the switch is opened during all durations to prevent watering from occurring. At step 1612 the auxiliary sprinkler controller determines whether the watering program for the day is over, and when it is over, in step 1614 the switch is monetarily opened (if it were closed) to ensure no further watering occurs. At step 1616 the interrupt switch can be closed in order to allow for maintenance operations or detection of other anomalous operation. In step 1618, if a pulse at the solenoid is detected outside of the legacy sprinkler controller's schedule, such as occurs when maintenance personnel engage an override switch to force the sprinkling system to turn on, then in step 1620 an alarm message can be generated and transmitted to the server.

In general, anomalous operation of the legacy sprinkler controller can occur due to a variety of conditions, including maintenance operations where the legacy sprinkler controller is locally controlled manually, shift or drifts in time of the expected time of occurrence of the durations of the legacy sprinkler controller (indicating a bad backup battery), failure of the legacy sprinkler controller to provide any durations during a given time period (e.g. 24 hours), and so on. Furthermore, the watering program can be sent by the server, or other remote device, regularly (e.g. once a day) and can indicate the desired water to occur over the next several days in case there is a loss of communication between the auxiliary sprinkler controller and the remote device. The auxiliary sprinkler controller, if it fails to receive an update or new watering program at the end of the period of the last received watering program, can then operate according to a default watering program (e.g. water every n days, or repeat the last received watering program).

Accordingly, the embodiments of the disclosure provide the benefit allowing the remote control of a sprinkler system, as well as allowing adjustments in watering duration that can be realized in fewer than all zones, and that avoids overwatering by shifting the watering program upon the occurrence of a sufficient rain event. Changes to the watering program that are typically temporary, such as watering new sod in a zone every day, can be automatically reverted to a regular watering program after a period of time sufficient to allow the sod to become established. The automatic reversion to a regular watering program avoids the need for maintenance personnel to visit the sprinkler system and manually reset the watering control system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A method for operating a sprinkler system having a legacy sprinkler controller configured to provide a plurality of n durations daily to each of a plurality of sprinkler zones, each duration having a time of occurrence and length, the method comprising:

providing a watering program to an auxiliary sprinkler controller that is configured to inhibit and enable sprinkling by the legacy sprinkler controller;

at the time of occurrence for each of the plurality of durations, the auxiliary sprinkler controller selectively inhibiting or enabling sprinkling for each duration according to the watering program of the auxiliary sprinkler controller, thereby allowing $2^n$ different values of total sprinkling duration for each of the plurality of zones; and wherein the watering program is provided to the auxiliary controller and indicates, for each respective one of the plurality of n durations daily for each of the plurality of sprinkler zones, whether to inhibit or enable sprinkling for the respective one of the plurality of n durations at the time of their occurrence;

configuring the auxiliary sprinkler controller to receive the watering program daily, and wherein the watering program indicates which of the durations to enable or inhibit at the respective time of their occurrence for each of a next plurality of days.

2. The method of claim 1, further comprising:

the auxiliary sprinkler controller monitoring an electrical output from the legacy sprinkler controller to each of the plurality of sprinkler zones;

determining an initial condition of the legacy sprinkler controller based on the time of occurrence and length for each of the plurality of durations as indicated by a time and length of the legacy sprinkler controller providing electricity to each of the plurality of zones during each of the plurality of durations; and the auxiliary sprinkler controller reporting the initial condition to a remote server.

3. The method of claim 2, further comprising:

detecting, by the auxiliary sprinkler controller, an occurrence of an anomalous operation of the legacy sprinkler controller with respect to the initial condition; and sending an alert to the remote server by the auxiliary sprinkler controller indicating the anomalous operation.

4. The method of claim 3, wherein detecting the occurrence of the anomalous operation comprises detecting at least one of:
  operation of the legacy sprinkler controller at a time outside of a time of the initial condition of the legacy sprinkler controller;
  failure of the legacy sprinkler controller to operate during one or more of the durations;
  a shift in time of the initial condition; or
  a change in one or more of the durations from the initial condition.

5. The method of claim 2, further comprising receiving at the auxiliary sprinkler controller the watering program from the remote server.

6. The method of claim 2, wherein reporting the initial condition to the remote server is performed in part by the auxiliary sprinkler controller transmitting the initial condition in a message using an auxiliary communication circuit that is one of a cellular transceiver, a wired network circuit, or a local wireless transceiver.

7. The method of claim 1, further comprising configuring the auxiliary sprinkler controller to, upon not receiving the watering program within a time period equal to the next plurality of days, invoking a default watering program.

8. The method of claim 1, wherein the durations comprise a plurality of subsets, each subset including a respective duration for each zone, and the durations of each subset having a respective uniform length.

9. An auxiliary sprinkler controller operable to control sprinkling in a plurality of zones by a legacy sprinkler controller configured to provide a plurality of n durations daily to each of a plurality of sprinkler zones, each duration having a time of occurrence and length, the auxiliary sprinkler controller comprising:
  a microcontroller;
  a switch circuit, coupled to and controlled by the microcontroller, and operable to selectively open or close a circuit path between the plurality of zones and the legacy sprinkler controller;
  wherein the microcontroller is operable, by execution of programmatic instructions, to, at the time of occurrence for each of the plurality of durations selectively inhibit or enable sprinkling for each duration according to a watering program of the auxiliary sprinkler controller by opening or closing, respectively, the switch circuit, thereby allowing $2^n$ different values of total sprinkling duration for each of the plurality of zones;
  wherein the watering program is provided to the auxiliary controller and indicates, for each respective one of the plurality of n durations daily for each of the plurality of sprinkler zones, whether to inhibit or enable sprinkling for the respective one of the plurality of n durations at the time of their occurrence and wherein the watering program indicates which of the durations to enable or inhibit as the respective time of their occurrence for each of a next plurality of days.

10. The auxiliary sprinkler controller of claim 9, further comprising:
  a sense circuit coupled to the microcontroller and operable to sense an electrical current through the switch circuit when the switch circuit is closed, and a voltage when the switch circuit is open and provide current and voltage sense signals to the microcontroller;
  the microcontroller is further operable to determine an initial condition of the legacy sprinkler controller based on the time of occurrence and length for each of the plurality of durations as indicated by either the current signal or voltage signal; and
  the auxiliary sprinkler controller further comprising an auxiliary communication circuit, the microcontroller is further operable to, by execution of programmatic instructions, report the initial condition to a remote server via the auxiliary communication circuit.

11. The auxiliary sprinkler controller of claim 10, wherein the microcontroller is further operable, by execution of programmatic instructions, to:
  detect an occurrence of an anomalous operation of the legacy sprinkler controller with respect to the initial condition via the sense circuit; and
  send an alert to the remote server by the auxiliary sprinkler controller indicating the anomalous operation.

12. The auxiliary sprinkler controller of claim 11, wherein the microcontroller is operable, by execution of programmatic instructions, to detect at least one of:
  operation of the legacy sprinkler controller at a time outside of a time of the initial condition of the legacy sprinkler controller;
  failure of the legacy sprinkler controller to operate during one or more of the durations;
  a shift in time of the initial condition; or
  a change in one or more of the durations from the initial condition.

13. The auxiliary sprinkler controller of claim 10, wherein the microcontroller is further operable, by execution of programmatic instructions, to receive, via the auxiliary communication circuit, the watering program from the remote server.

14. The auxiliary sprinkler controller of claim 10, wherein the auxiliary communication circuit that is one of a cellular transceiver, a wired network circuit, or a local wireless transceiver.

15. The auxiliary sprinkler controller of claim 9, further comprising, upon not receiving the watering program within a time period equal to the next plurality of days, the microcontroller is operable, by execution of programmatic instruction, to invoke a default watering program, and selectively enable or inhibit according to the default watering program.

16. The auxiliary sprinkler controller of claim 9, wherein the durations comprise a plurality of subsets, each subset including a respective duration for each zone, and the durations of each subset having a respective uniform length.

17. A smart sprinkler system, comprising:
  a legacy sprinkler controller operable to provide, daily, for each of n durations, an electrical pulse to one of a plurality of solenoid-controlled valves for a corresponding zone of a plurality of zones;
  an auxiliary sprinkler controller operable to, at the time of occurrence for each of the plurality of durations, selectively inhibit or enable sprinkling for each duration according to a watering program of the auxiliary sprinkler controller by opening or opening or closing, respectively, the switch circuit, thereby allowing $2^n$ different values of total sprinkling duration for each of the plurality of zones, and further operable to determine an initial condition of the legacy sprinkler controller based on the time of occurrence and length for each of the plurality of durations; and
  a remote device operable to receive the initial condition of the legacy sprinkler controller from the auxiliary sprinkler controller and present an interface to a user to receive input from the user for the watering program, wherein the user selects ones of the durations of the legacy sprinkler controller in the interface for the watering program, and wherein the server communicates the watering program to the auxiliary sprinkler controller.

18. The smart sprinkler system of claim 17, wherein the remote device is a server, and the interface is provided by the server to the user at a client device located remotely from the server.

19. The smart sprinkler system of claim 17, wherein the watering program indicates desired sprinkling activity for a plurality of days, and wherein the remote device communicates the watering program periodically at intervals less than the plurality of days.

20. The smart sprinkler system of claim 19, wherein the remote device automatically adjusts the watering program to not water at the sprinkling system for a number of days after a rainfall event at a location of the sprinkler system.

21. The smart sprinkler system of claim 20, wherein the remote device presents a calendar display in the interface indicating past and upcoming sprinkling events of the watering program, as well as rain events when such rain events have occurred.

22. The smart sprinkler system of claim 17, wherein the auxiliary sprinkler controller is further operable to detect anomalous operation of the legacy sprinkler controller and communicate an alert to the remote device indicating detection of the anomalous operation, wherein in response the remote device provides, in the interface, an alert indicating the anomalous operation.

23. The smart sprinkler system of claim 22, wherein the anomalous operation includes at least one of a time shift of the programs or manual operation of the legacy sprinkler controller.

* * * * *